US006501382B1

(12) United States Patent
Rehfus et al.

(10) Patent No.: US 6,501,382 B1
(45) Date of Patent: Dec. 31, 2002

(54) BEARING WITH DATA STORAGE DEVICE

(75) Inventors: Kevin E. Rehfus, North Canton; Douglas H. Smith, Akron, both of OH (US)

(73) Assignee: Timken Company, Canton, OH (US)

( * ) Notice: Subject to any disclaimer, the term of this patent is extended or adjusted under 35 U.S.C. 154(b) by 38 days.

(21) Appl. No.: 09/878,485

(22) Filed: Jun. 11, 2001

(51) Int. Cl.$^7$ .............................................. G08B 13/14
(52) U.S. Cl. .............................. 340/572.8; 340/572.1; 340/539; 384/459; 235/462.46
(58) Field of Search .................... 340/572.1, 572.7, 340/572.8, 539; 384/459; 235/462.46

(56) References Cited

U.S. PATENT DOCUMENTS

| | | | | |
|---|---|---|---|---|
| 4,970,495 A | * | 11/1990 | Matsumoto et al. | 340/572.1 |
| 5,461,385 A | | 10/1995 | Armstrong | 342/42 |
| 5,528,222 A | * | 6/1996 | Moskowitz et al. | 340/572.7 |
| 5,640,002 A | | 6/1997 | Ruppert et al. | 340/572.7 |
| 5,764,138 A | | 6/1998 | Lowe | 340/572.7 |
| 6,047,579 A | | 4/2000 | Schmitz | 72/15.1 |
| 6,078,259 A | | 6/2000 | Brady et al. | 340/447 |
| 6,107,920 A | | 8/2000 | Eberhardt | 235/462.46 |
| 6,161,962 A | | 12/2000 | Franch et al. | 384/459 |

FOREIGN PATENT DOCUMENTS

EP 0594550 8/1998

OTHER PUBLICATIONS

A–B Product Data Bulletin 2750—Radio Frequency Tags, Publication 2750-2.9—Jun. 1989, pp. 1–7.
RF–ID.com Applications web page—Aug. 29, 2000.
RF–ID.com web page—Tags, Radio Frequency Identification Transponders and RFID Reader/Writer units—Nov. 1, 2000.
RF–ID .com Automotive web page—Nov. 1, 2000.
Idat.com/trfdc.html web page Radio Frequency: Radio Frequency Data Communications (RFDC) 3 pages—Aug. 29, 2000.
AIM—The AIM Global Network "Standards" web pages—Aug. 29, 2000 (2 pages), Aug. 31, 2000 (11 pages) and Nov. 1, 2000 (5 pages).

* cited by examiner

Primary Examiner—Daryl Pope

(57) ABSTRACT

A product with an automatic identification and data capture (AIDC) device associated with a physical measurement, authentication code or operating condition of the product is disclosed. A bearing with an embedded transponder is illustratively described. The transponder contains data specific to the manufactured bearing, such as physical measurements or identification numbers.

25 Claims, 2 Drawing Sheets

BEARING WITH DATA STORAGE DEVICE

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Many manufactured products or components of products are considered to be fungibles, that is to say each product or component is virtually identical with the other. In reality, such manufactured products or components are made within certain tolerances, so that the differences between those products are within an acceptable range of measurable physical properties. In many applications, the consumer of a manufactured product is unconcerned with the specific physical properties of that product, so long as the product falls within the specified tolerance levels presented by the manufacturer.

However, in certain applications, a consumer of a manufactured or OEM part must make accommodations for even miniscule variations within the manufactured part, regardless of whether or not the product falls within the tolerances presented by the manufacturer. Thus, the consumer needs to know the exact measurements of the part, rather than just the nominal measurements of the part. Heretofore, the consumer would resort to physically measuring the manufactured part to determine its true and exact dimensions. For example, the consumer of anti-friction bearings may require the inner diameter of the inner race surface or bore size to be of an exact dimension to fit on a shaft of a particular size to avoid an excessive pre-load on the bearing. The consumer of such an anti-friction bearing traditionally would measure the bearing with a precision device, such as a laser micrometer to determine the actual inner diameter, and then grind the inner diameter of the bearing or apply shims to the bearing, as necessary, to obtain a proper fit of the bearing on the shaft.

The manufacturer of the anti-friction bearing may make physical measurements of each product, for quality control or other purposes. Therefore, the manufacturer of the anti-friction bearing may have the actual physical properties of each manufactured product produced. However, due to traditional arrangements between suppliers and customers in which a customer purchases a component within a guaranteed tolerance range, the supplier does not make use of any measured component data beyond its own internal quality control practices. Thus, the customer knows only the nominal dimensions of the manufactured part, and that the part is within whatever tolerances are specified for the part.

The typical anti-friction bearing has inner and outer races provided with opposed raceways and rolling elements which are located between the races where they roll along the raceways when the bearing is set in operation, thereby reducing friction to a minimum. The bearing often contains a lubricant and its ends are closed by seals to exclude contaminants from the interior of the bearing and of course to retain the lubricant in that interior. A bearing often fails for lack of lubrication or by reason of a defect in one of its raceways or rolling elements. But when assembled, the raceways and rolling elements are totally obscured and cannot be inspected without disassembling the bearing. This, of course, requires removing the bearing from the object upon which it is installed, such as a rail car journal, a vehicle axle, or a mill roll, for example.

Sometimes, a defect in an anti-friction bearing may manifest itself in a condition that is subject to detection on the exterior of the bearing, although not necessarily through a visual inspection. For instance, a rise in temperature can denote a lack of lubrication, or perhaps, even a seizure in which both races turn and the anti-friction bearing in effect becomes an unlubricated sleeve bearing. Also, spalling or other defects in the raceways or rolling elements may produce excessive vibrations in the bearing.

Devices exist for monitoring the operation of bearings. For example, railroads have trackside infrared sensors which monitor the journal bearings of passing trains, but they exist at a relatively few locations often many miles apart and will not detect the onset of a temperature rise occurring between such locations. Some bearings come equipped with their own sensors which are coupled to monitoring devices through wires. As a consequence, the race which carries the sensor for such a bearing must remain fixed, that is to say, prevented from rotating, or the wires will sever. And with a railroad journal bearing, at least, the outer race preferably should remain free enough to,"creep", that is rotate in small increments, so that wear is distributed evenly over the circumference of the outer raceway. Furthermore, preventing cup creep requires a costly locking mechanism.

Another problem facing the user of an anti-friction bearing is that of verifying the authenticity of those bearings. The user typically expects the bearing to be produced by the manufacturer listed on the packaging of the bearing. However, it is becoming common for unscrupulous manufacturers to produce counterfeit parts, labeling those parts under a respected, recognized name.

There is therefore a need for a bearing that enables the customer or user of the bearings to quickly and :accurately determine the true and exact dimensions of that individual bearing; for a bearing that enables the user to monitor the performance of the bearing under working conditions; and for a bearing that enables the user of the bearing to verify the authenticity of the bearing.

BRIEF SUMMARY OF THE INVENTION

The present invention relates to devices that provide data about manufactured items and field serviceable products, and more particularly to radio frequency emitting devices that transmit or receive physical measurements, statistical, or inventory data that is embedded in a bearing through such devices. Optionally, the radio frequency emitting devices that transmit data include an appropriate sensor that reflects certain operating conditions of the bearing through the radio frequency emitting device. It is further intended that a bearing fitted with a radio frequency emitting device of the present invention may optionally have unique indicia, such as, for example, a serial or other identification number, for verification of the authenticity of the bearing.

An automatic identification and data capture (AIDC) device for acquiring manufacturing data associated with individual bearings are utilized by a consumer of the bearing, preferably based upon a tag that is attached, either permanently or removably, to the bearing. By encoding physical properties of the bearings in a radio frequency (RF) tag for example, a consumer of the bearings may receive physical data specific to the particular bearing by using a receiver or reader. The data is processed by a microprocessor controlled device, such as for example a computer, PDA, or other devices well known in the art. Thus, the consumer is not required to measure the desired physical characteristic of the bearing, but may make modifications to or accommodations for the bearing based upon the data obtained from the manufacturer through the RF tag.

BRIEF DESCRIPTION OF THE SEVERAL VIEWS OF THE DRAWINGS

Corresponding reference characters indicate corresponding parts throughout the several views of the drawings.

DETAILED DESCRIPTION OF INVENTION

Figure 1:
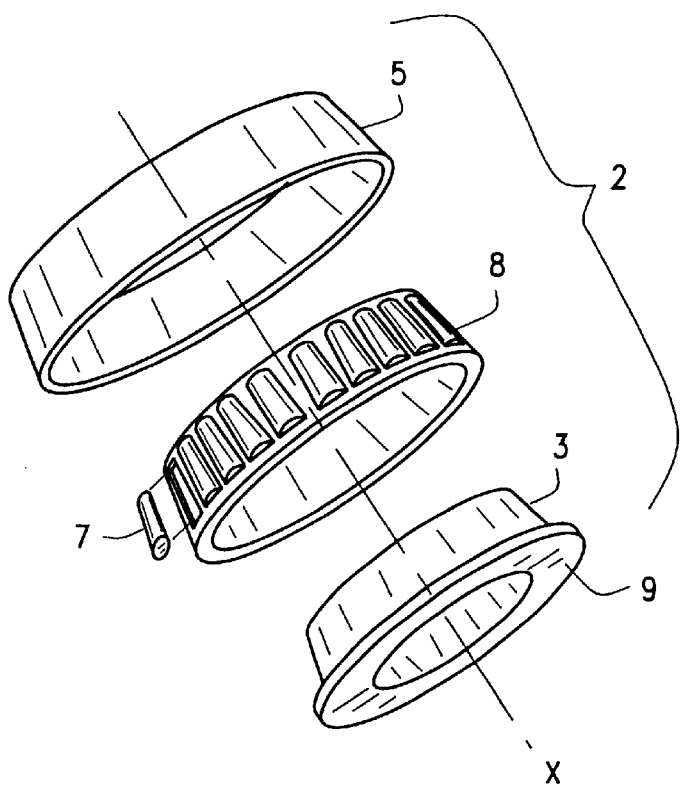
FIG. 1 is an exploded view of a prior art bearing.

Referring to FIG. 1, a prior art bearing 2 has an inner race in the form of a cone 3, an outer race in the form of a cup 5, rolling elements in the form of tapered rollers 7 disposed between the inner race 3 and the outer race 5, and a cage 8 which maintains the proper spacing between adjacent rollers 7. The centers of the inner and outer races 3 and 5 respectively lie along an axis X which is the axis of rotation for the bearing 2. The inner race 3 has an end face 9 located in a plane perpendicular to the axis X, and forms one of several external surfaces on the race.

Automatic Identification and Data Capture (AIDC) is a term of art used to describe direct entry of data into a computer system, programmable logic controller (PLC) or other microprocessor-controlled device without using a keyboard.

The present invention uses an AIDC device associated with a bearing, preferably attached to the bearing, and more preferably permanently attached to a bearing, for encoding the bearing with a value associated with the manufacture of the bearing (i.e., a true dimension of the bearing); identification of the bearing (i.e., a serial number for the bearing); or inspection and maintenance associated with the bearing (last lubrication date, regrind date, etc.); condition monitoring (i.e., maximum temperature exposure, maximum rotational speed attained, etc.); and inventory information.

AIDC devices include magnetic means including contact memory, magnetic stripe cards and card readers; optical means including machine vision systems such as bar code readers and bar codes such as linear and two-dimensional and three-dimensional matrix barcodes; and electromagnetic means including smart cards (also called "chip cards," or "integrated circuit cards") of both the memory type and intelligent type and both the contact and contactless type, including radio frequency identification (RFID) readers and tags of both active and passive type. These examples are merely illustrative, and not intended to be limiting in scope. The AIDC devices are machine readable, and the reader includes an output or display to display the information contained on the AIDC device. As can be appreciated, an AIDC system includes the AIDC device, which is associated with a product, such as a bearing, and a reader for reading the AIDC device and displaying the information contained on the AIDC device.

Figure 2:
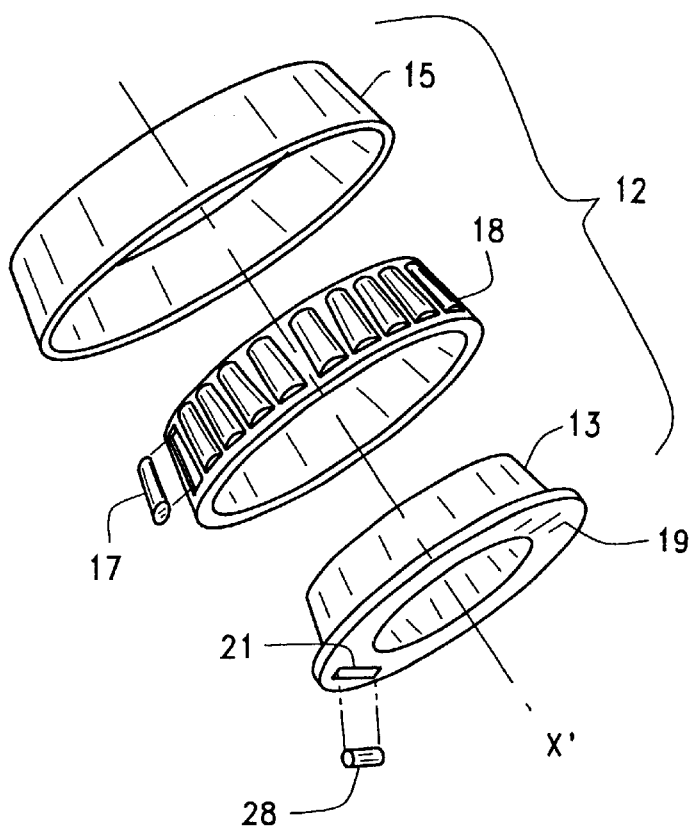
FIG. 2 is an exploded view of an embodiment of the present invention having a bearing with an RF tag for embedding therein.

Referring now to FIG. 2, a bearing 12 of the present invention has an inner race in the form of a cone 13, an outer race in the form of a cup 15, rolling elements in the form of tapered rollers 17, and a cage 18 which maintains the proper spacing between adjacent rollers 17. Although the invention is shown as part of a tapered roller bearing, the invention can be incorporated with any type of bearing. The centers of the inner and outer races 13 and 15 respectively lie along an axis X' which is the axis of rotation for the bearing 12. The inner race 13 has an end face 19 located in a plane perpendicular to the axis X'. Formed within the end face 19 of the inner race 13 is a pocket or chamber 21. The chamber 21 defines a first side 23, a second side 24, a third side 25 and a fourth side 26. The chamber 21 is recessed to a depth D (FIG. 4) sufficient to hold a suitable RF tag 28 such that the upper surface 29 of the RF tag 28 is positioned at or below the surface of the end face 19 of the inner race 13. The chamber 21 may be formed contemporaneously with manufacture of the inner race 13 or may be formed in an existing inner race using a point tool or other suitable machining or forming device. Further, the chamber 21 can be formed on other surfaces as well. For example, the chamber 21 can be formed on the outer surface of the cup or outer race 15.

Figure 3:
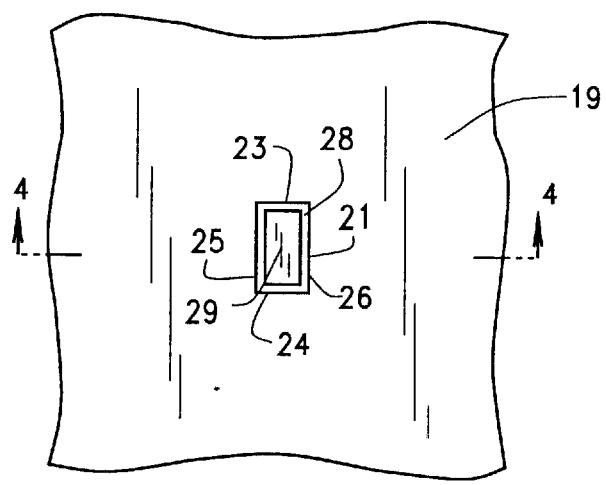
FIG. 3 is an enlarged fragmentary view of an end wall of the bearing with a chamber formed therein and an RF tag received in the chamber.
Figure 4:
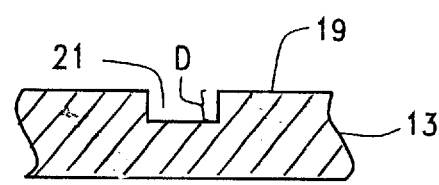
FIG. 4 is a cross sectional view taken along line 4—4 of FIG. 3, but showing the RF tag detached.

Referring now to FIGS. 2–4, in the preferred embodiment of the present invention, a suitable transponder, preferably a radio frequency identification (RFID) tag 28 is secured into the chamber 21. In this preferred embodiment, the RFID tag 28 is one commonly called a; "coffin" tag, due to its unique shape, and the chamber 21 is sized and shaped to receive the RFID tag. However, the chamber 21 may be formed in any suitable shape, based upon the ease of formation, space considerations, type and shape of the RF tag used, and the like. It is to be understood that other shaped and sized tags could be used in the practice of the present invention, and that the preferred coffin tag is merely illustrative. The RFID tag 28 may be secured in the chamber 21 by any acceptable method, including potting, gluing, or entrapping, for example. Preferably, the RFID tag 28 is potted in chamber 21 to a depth sufficient to secure the RFID tag 28 in position at or below the surface 19 of the inner race 13. Additionally, the chamber 21 is sized to allow for some clearance (i.e., approximately 1/16") between the RFID tag and the chamber walls to aid the RF signal in getting out of the chamber.

Figure 5:
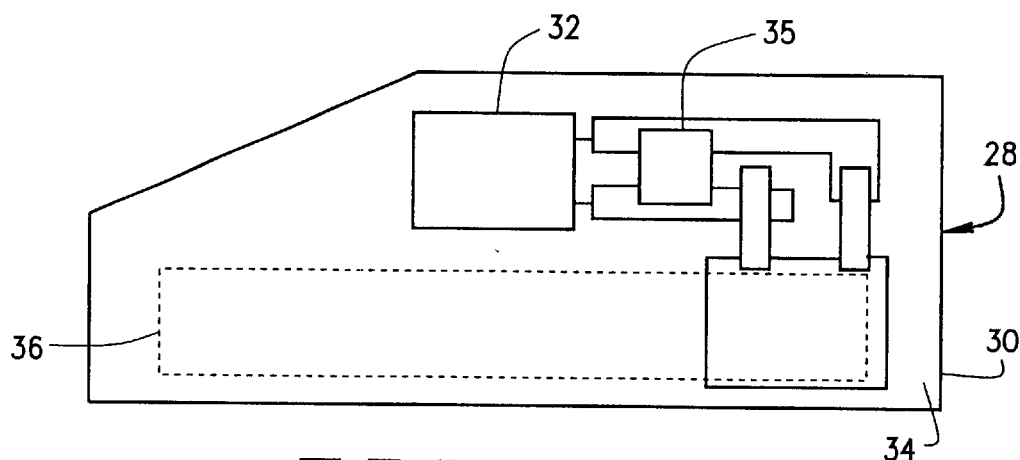
FIG. 5 is a block diagram of an RFID tag of the present invention.

Referring now to FIG. 5, the preferred RFID tag 28 has a case or shell 30, and a non-volatile memory chip 32, preferably an electronically erasable programmable read/write memory chip (EEPROM).

The significant advantage of all types of RFID systems is the non-contact, non-line-of-sight nature of the technology. RF tags can be read through a variety of substances such as snow, fog, ice, paint, grease, and other visually and environmentally challenging conditions, where barcodes or other optically read technologies would be compromised. RFID tags can also be read in challenging circumstances at remarkable speeds, in most cases responding in less than 100 milliseconds, depending upon the quantity of data stored.

Developments in RFID technology continue to yield larger memory capacities, wider reading ranges, and faster processing.

RFID tags are categorized as either active or passive. As used herein, the term transponder is intended to describe both active and passive tags. Active RFID tags are powered by an internal power supply or battery and are typically read/write tags, that is, tag data can be rewritten and/or modified. An active tag's memory size varies according to application requirements; larger memory sizes are available for active tags as compared with passive tags. Active tags also provide for greater transmission distances as compared with passive tags. The battery-supplied power of an active tag generally gives it a longer read range. The trade off is greater size, greater cost, and a limited operational life (which may yield a maximum of 10 years, depending upon operating temperatures, battery type, frequency, and amount of data retrieved).

Passive RFID tags operate without a separate external power source and obtain operating power generated from a reader. Passive tags consequently are much lighter and smaller than active tags, less expensive, and offer a virtually unlimited operational lifetime. A disadvantage of passive tags is that passive RFID tags have shorter read ranges than active tags and require a higher-powered reader. Read-only tags are typically passive and are programmed with a unique set of data (usually 32 to 128 bits) that sometimes cannot be modified. Read-only tags are useful for a limited amount of data, such as identification as in, for example, a serial number, or a small number of physical properties. Some passive tags are read/write capable. These read/write passive tags are preferred in the practice of the present invention to enable coding of inspection, maintenance, and condition information on the RFID tag.

Referring to FIG. 5, in the preferred embodiment of the present invention a charge cap 35 is associated with the EEPROM chip 32. An antenna 36, preferably a ferrite coil antenna, is provided. This arrangement allows for data to be stored in the RFID tag 28, including product identification, manufacturing measurements. Additionally, bearings are sometimes refurbished after a period of use. The RFID tag 28 may store information about such refurbishing, and may include additional measurements made after such refurbishing. Optionally, a sensor may be added to the bearing, either as a part of the RFID tag, or as a separate component associated with the RFID tag. The sensor may determine operating conditions, either continuously or at predetermined intervals, and may optionally record operating conditions to which the bearing is exposed. Examples of operating conditions are current bearing temperature, load, vibration, and the like. The tag, when interrogated, would then transmit a bearing operating value corresponding to the measured bearing operating condition. Additionally, inventory information can be stored in the RFID tag.

Figure 6:
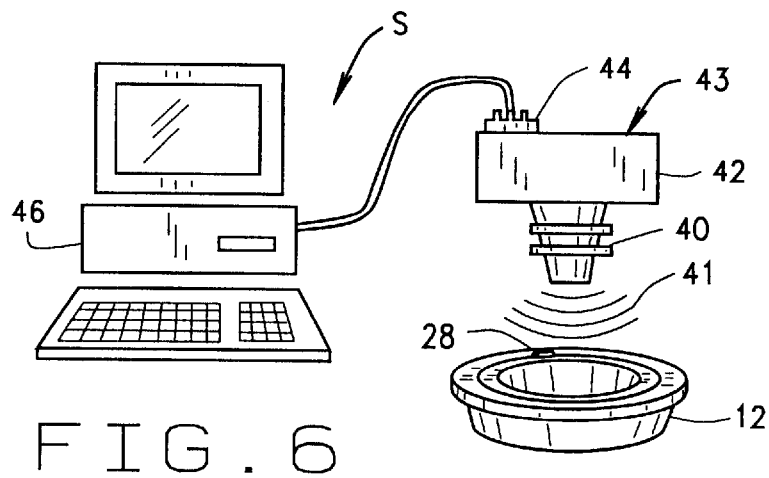
FIG. 6 is a block diagram of an RFID system of the present invention.

Referring now to FIG. 6, an RFID system S of the present invention comprises five components: A reader/writer antenna or coil 40; a transceiver 42 including a decoder and an interface 44; a computer 46; a transponder 28 (referred to herein as an RF tag) that is electronically programmed with manufacturing information; and a bearing 12 housing the RFID tag 28. The antenna 40 emits radio signals to activate the tag 28 to read the data stored on the tag. The antenna 40 is the link between the tag 28 and the transceiver 42, which controls the system's data acquisition and communication. Antennas are available in: a variety of shapes and sizes, and the illustrative example should be understood as being interchangeable with any suitable antenna.

The electromagnetic field 41 produced by the antenna 40 can be constantly present when multiple tags are expected continually. Alternatively, if constant interrogation is not required, the field 41 may be activated by a sensor device (not shown).

Preferably, the antenna 40 is packaged with the transceiver 42 and decoder to form a reader 43, sometimes called an interrogator, which can be configured either as a handheld or a fixed-mount device. The reader 43 emits radio waves 41 in ranges of anywhere from one inch to 100 feet or more, depending upon its power output and the radio frequency used. When the RFID tag 28 passes through the electromagnetic zone 41, it detects the activation signal of the reader 43 and transmits its data to the reader 43. The reader 43 decodes the data encoded in the tag's integrated circuit (silicon chip) and the data is passed through the interface 44 to the host computer 46 for processing.

The consumer of a bearing may thus obtain specific physical measurements or historical status of a particular bearing by "reading" encoded information from the embedded tag contained in the bearing using an acceptable interrogator.

Where the words "approximately" or "about" are used in conjunction with dimensions, measurements, or ratios, the words are meant to include a 10% margin on either side of the dimension, measurement, ratio, etc. Hence, the terms "approximately 1" or "about 1" means from 0.9 to 1.1.

Numerous variations will occur to those skilled in the art in light of the foregoing disclosure. For example, alternative AIDC methods may be employed, as are known in the art or to be developed in the art. Although the chamber 21 is shown on the inner race in the illustrative example shown, it will be appreciated, that, depending on the type of bearing, the chamber 21 can be formed on other external surfaces of the bearing as well. Further, other manufactured products, in addition to the illustrative anti-friction bearing, may be used in the practice of the present invention. The transponder may be attached to the bearing but removable by the consumer of the bearing, making location of the tag less important. For example, the tag may be attached to the cage; or, it may be glued, screwed, or otherwise secured to an internal, non-contact surface of the bearing, such as the outer diameter surface of the large (or thrust) rib or the outer race, etc. The transponder may be encoded with only a serial number, such that the serial number may be associated for identification of a unique bearing and a database that contains physical properties of that particular bearing. These examples are merely illustrative.

What is claimed is:

1. In a bearing having an inner race, an outer race, a plurality of rolling members disposed between said inner race and said outer race, and a cage to maintain a desired spacing between said rolling members; the improvement comprising a pocket formed in a surface of said bearing and a self-contained transponder assembly received in said pocket; said transponder assembly containing data unique to the individual bearing containing said transponder assembly; said self-contained transponder assembly comprising a housing, a memory chip on which said data is encoded and an antenna capable of detecting electromagnetic signals, said memory chip and antenna being contained in said transponder assembly housing; said transponder assembly and said bearing pocket being sized such that an upper surface of said transponder housing does not extend above said bearing surface.

2. The bearing of claim 1 wherein said data is chosen from the group consisting essentially of at least one measured physical property unique to said bearing, product identification data, inspection and maintenance data, condition monitoring data, inventory information data, and combinations thereof.

3. The bearing of claim 1 wherein said transponder is an RF tag.

4. The bearing of claim 2 wherein said RF tag includes an EEPROM chip.

5. The bearing of claim 4 wherein said RF tag further includes a power supply.

6. The bearing of claim 5 wherein said surface of said bearing in which said pocket is formed is an outer surface of said bearing.

7. The improvement of claim 1 wherein said memory chip is a rewritable memory chip, and the information on said chip can be updated or altered by a consumer or manufacturer.

8. In combination, a bearing and a self-contained AIDC device, said bearing comprising an inner race, an outer race, a plurality of rolling members positioned between said inner and outer races, and a cage for maintaining a desired spacing between said rolling members; said bearing further including a surface and a pocket formed in said surface; said self-contained AIDC device including a memory chip and an antenna and being fully received in said pocket, said pocket being sized such that said AIDC device does not extend above said surface; said AIDC device containing information associated with the manufacture of the bearing.

9. The bearing of claim 8 wherein said AIDC device is a transponder.

10. The bearing of claim 8 wherein said transponder is an RF tag.

11. The bearing of claim 8 wherein said information associated with said individual bearing is a physical property of said individual bearing.

12. The bearing of claim 11 wherein said information associated with said individual bearing comprises a measurement taken during manufacture of said bearing.

13. The bearing of claim 11 wherein information value associated with said individual bearing comprises a maintenance record.

14. The bearing of claim 13 wherein said maintenance record comprises the last identified lubrication of said bearing.

15. The bearing of claim 12 wherein said information associated with said bearing further comprises an identification number.

16. The bearing of claim 12 wherein said information associated with said individual bearing further comprises a measured operating value of said bearing.

17. The bearing of claim 16 wherein said measured operating value is chosen from the group consisting essentially of the bearing temperature, maximum temperature achieved, maximum vibration recorded, cumulative revolutions, and combinations thereof.

18. A method of communicating manufacturing information for a bearing to a consumer of the bearing:
   manufacturing a bearing having a pocket in a surface of said bearing;
   acquiring physical data associated with said bearing;
   positioning a self-contained AIDC device in said bearing pocket, said bearing pocket being sized such that said AIDC device does not extend above said bearing surface, said self-contained AIDC device comprising a memory chip and an antenna for said AIDC device;
   encoding said acquired physical data in said memory chip;
   said data being: readable by a consumer of said bearing for receiving and interpreting manufacturing data associated with said bearing by passing said bearing through an electromagnetic field.

19. The method of claim 18 wherein said encoded data is a serial number.

20. The method of claim 18 wherein said encoded data is interpreted by a computer.

21. The method of claim 20 wherein said computer is operated by a consumer of said product.

22. The method of claim 20 wherein said data comprises at least one physical measurement of said product.

23. The method of claim 20 wherein said data comprises a maintenance data.

24. The method of claim 20 wherein said data further comprises an authentication code.

25. The method of claim 20 wherein said data further comprises a monitored operating condition.

* * * * *